(12) United States Patent
Nakano et al.

(10) Patent No.: US 7,172,218 B2
(45) Date of Patent: Feb. 6, 2007

(54) PRETENSIONER

(75) Inventors: Yoshiyuki Nakano, Shiga (JP); Masahiko Iwai, Shiga (JP); Tadahiro Nakayama, Shiga (JP)

(73) Assignee: Takata Corporation, Tokyo (JP)

( * ) Notice: Subject to any disclaimer, the term of this patent is extended or adjusted under 35 U.S.C. 154(b) by 23 days.

(21) Appl. No.: 10/064,720

(22) Filed: Aug. 9, 2002

(65) Prior Publication Data

US 2003/0030263 A1 Feb. 13, 2003

(30) Foreign Application Priority Data

Aug. 10, 2001 (JP) .............................. 2001-244005
Sep. 7, 2001 (JP) .............................. 2001-271436

(51) Int. Cl.
*B60R 22/46* (2006.01)
*B60R 22/40* (2006.01)

(52) U.S. Cl. ..................... 280/806; 297/480; 60/635

(58) Field of Classification Search ............... 280/806; 297/480; 60/635, 632, 532
See application file for complete search history.

(56) References Cited

U.S. PATENT DOCUMENTS

| | | | |
|---|---|---|---|
| 3,871,470 A * | 3/1975 | Schwanz et al. ............ 297/480 |
| 4,237,690 A | 12/1980 | Tsuge et al. |
| 4,444,010 A * | 4/1984 | Bendler ........................ 60/407 |
| 4,458,921 A * | 7/1984 | Chiba et al. ................ 280/806 |
| 4,927,175 A * | 5/1990 | Fohl ............................ 280/806 |
| 5,145,209 A * | 9/1992 | Lenzen ........................ 280/806 |
| 5,207,618 A * | 5/1993 | Nishizawa ................... 474/101 |
| 5,310,219 A * | 5/1994 | Fohl ............................ 280/806 |
| 5,411,291 A * | 5/1995 | Fohl ............................ 280/806 |
| 5,450,723 A * | 9/1995 | Fohl ............................ 60/638 |
| 5,481,940 A * | 1/1996 | Betz ............................ 74/502.6 |
| 5,495,790 A * | 3/1996 | Greiner ........................ 92/85 R |
| 5,639,120 A * | 6/1997 | Kmiec et al. ............... 280/806 |
| 5,667,246 A * | 9/1997 | Miller, III ................... 280/806 |
| 5,762,372 A * | 6/1998 | Koujiya et al. ............. 280/806 |
| 5,908,222 A * | 6/1999 | Wier ........................... 297/480 |
| 5,944,350 A * | 8/1999 | Grabowski et al. ......... 280/806 |
| 6,039,353 A * | 3/2000 | Bauer et al. ................ 280/806 |
| 6,076,856 A * | 6/2000 | Wang et al. ................ 280/806 |
| 6,113,145 A * | 9/2000 | Evans ........................ 280/806 |
| 6,206,423 B1 | 3/2001 | Wier |
| 6,264,281 B1 * | 7/2001 | Dukatz et al. .............. 297/480 |

(Continued)

FOREIGN PATENT DOCUMENTS

DE 37 18 117 A1 12/1988

(Continued)

Primary Examiner—Paul N. Dickson
Assistant Examiner—George D. Spisich
(74) Attorney, Agent, or Firm—Foley & Lardner LLP

(57) ABSTRACT

A pretensioner including a cylinder in which a piston slides. A side of the pipe attached to a bracket is curved at a predetermined angle. One linear portion of the pipe serves as the cylinder, and the other linear portion of the pipe serves as a gas-generator accommodating portion that accommodates a gas generator. A wire passing hole through which a wire passes is bored coaxially with the center axis of the piston sliding portion of the pipe. The piston sliding portion and the gas-generator accommodating portion can be formed of the single pipe, and the gas generator and the wire can be prevented from interfering with each other.

16 Claims, 24 Drawing Sheets

U.S. PATENT DOCUMENTS 6,345,504 B1 * 2/2002 Takehara et al. .............. 60/638
6,374,609 B1 * 4/2002 Evans et al. .................. 60/532
2004/0212188 A1 * 10/2004 Terasaki .................... 280/806
2005/0218647 A1 * 10/2005 Nakayama et al. ......... 280/806

FOREIGN PATENT DOCUMENTS

| | | |
|---|---|---|
| DE | 42 27 780 A1 | 2/1994 |
| JP | 2000-326823 | 11/2000 |
| JP | 2001-039268 | 2/2001 |
| WO | WO 97/58377 | * 11/1999 |
| WO | WO 00/21796 A1 | 4/2000 |

* cited by examiner

PRETENSIONER

BACKGROUND OF THE INVENTION

The present invention belongs to a pretensioner which is used, for example, in a seat belt device attached to the seat of a vehicle, such as a car. The pretensioner typically applies a tension on a seat belt and increases the restraint force on the occupant in the case of an emergency such as, for example, a vehicle collision. More particularly, the present invention relates to a pretensioner in which a piston is operated by the pressure of gas generated by a gas generator so as to apply a tension to a seat belt.

Conventionally, the seats of vehicles, such as cars, are provided with seat belt devices, and the seat belt devices serve to protect the occupant by restraining the occupant with the seat belt and reducing the inertial movement of the occupant when an extremely high vehicle deceleration is caused in the case of an emergency such as a vehicle collision. Some of such conventional seat belt devices have a pretensioner that quickly restrains the occupant with a great restraint force by tensioning the seat belt to increase the restraint force in the above emergency. While the pretensioner is generally disposed in a seat-belt retractor of the seat belt device, it is sometimes disposed in a buckle or a lap anchor.

For example, a seat belt device having a buckle pretensioner is disclosed in Japanese Unexamined Patent Application Publication No. 2000-326823 (incorporated by reference herein). This publication discloses two types of buckle pretensioners. In the first type, a buckle is pulled by the pulling of a connecting member for connecting the buckle and a piston into a cylinder, in which the piston slides, when actuated. In the buckle pretensioner, a gas generator is mounted on a base and a piston and a cylinder are attached to the gas generator. A middle portion of the connecting member is curved by a pulley mounted in the base so as to change the direction thereof. The buckle-pulling direction and the piston-sliding direction are set to form a predetermined angle therebetween. When the buckle pretensioner is actuated, the piston is operated by the pressure of gas generated by the gas generator to draw the connecting member, so that the buckle is pulled.

In the second type of buckle pretensioner, when actuated, a connecting member for connecting a buckle and a base is pressed by a piston, and the buckle is thereby pulled. A piston and a cylinder are mounted on a base and a gas generator is disposed in the cylinder. A middle portion of the connecting member is curved by a pulley disposed in a piston rod so as to change the direction thereof, and the buckle-pulling direction and the piston-sliding direction are set to form a predetermined angle therebetween. When the buckle pretensioner is actuated, the piston is operated by the pressure of gas generated by the gas generator, and the pulley presses the connecting member, so that the buckle is pulled.

In both the first and second types of buckle pretensioners disclosed in the aforementioned publication, a pressure vessel for accommodating the gas generator, and the cylinder in which the piston slides are made of separate components. As a result, the number of components and the number of assembly processes increase, and the cost is increased. In particular, the pressure vessel of the first type is generally made by die-casting in zinc in order to ensure pressure strength, and for this reason, both the weight and thickness thereof are increased.

A seat belt device having a buckle pretensioner in which a pressure vessel and a cylinder are formed of a single component is disclosed in Japanese Unexamined Patent Application Publication No. 2001-39268 (incorporated by reference herein). In the buckle pretensioner disclosed in this publication, a buckle and a piston are connected by a connecting member, and the piston is slidably fitted in one case. Further, a gas generator is fixed by a fixing member inside the case so that it is coaxial with the sliding axis of the piston. A middle portion of the connecting member is bent by a lock member rotatably disposed so as to change the direction thereof, and the buckle-pulling direction and the piston-sliding direction are set to form a predetermined angle therebetween. When the buckle pretensioner is actuated, the piston is operated by the pressure of gas generated by the gas generator so as to draw the connecting member, so that the buckle is pulled.

Since the pressure vessel for the gas generator and the cylinder are thus formed of a single component, the number of components and the number of assembly processes are reduced, and the cost is thereby reduced.

However, in the buckle pretensioner disclosed in Japanese Unexamined Patent Application Publication No. 2001-39268, the gas generator is fixed by the fixing member inside the case so that it is offset from the piston toward the buckle and is coaxial with the sliding axis of the piston, as a result the connecting member for connecting the buckle and the piston needs to be positioned to avoid interference with the gas generator and, therefore, the connecting member and the gas generator are placed in parallel. However, when the connecting member and the gas generator are placed in parallel, the cross-sectional area of the case is large. Accordingly, in order to prevent the cross-sectional area of the case from becoming large, it is essential to use a gas generator having a special shape that is different from the shape of the conventional gas generator, for example, the shape of an elongated straw. For this reason, it is not preferred to use standard-shape gas generators that have been used heretofore.

SUMMARY OF THE INVENTION

The present invention has been made in view of such problems, and an object of the invention is to provide a small, light, and inexpensive pretensioner that can reduce the number of components and the number of assembly processes, and that can use a conventional standard-shape gas generator.

According to an embodiment of the present invention a pretensioner is provided for increasing the restraint force of a seat belt on an occupant by drawing a connecting member connected to a piston, which is operated by the pressure of gas generated by a gas generator, and a buckle or a lap belt of the seat belt and pulling the buckle or the lap belt when a high vehicle deceleration is caused, for example, in the case of a vehicle collision. The piston is fitted in a linear piston sliding portion. The pretensioner further includes gas-generator accommodating portion in which the gas generator is accommodated. The linear sliding portion and the gas-generator accommodating portion are formed in single tubular member by bending the tubular member.

According to an embodiment of the present invention, the gas-generator accommodating portion may be acutely bent with respect to the piston sliding portion so as to extend toward the piston sliding portion, is obtusely bent with respect to the piston sliding portion so as to extend toward the side opposite from the piston sliding portion, extends in parallel with the piston sliding portion and toward the side opposite from the piston sliding portion so as not to be coaxial with the piston sliding portion, or extends in parallel with the piston sliding portion and toward the piston sliding portion.

According to another embodiment of the present invention, the tubular member may have a connecting-member passing hole bored coaxially with the piston so that the connecting member is passed therethrough, and the connecting member connected to the piston extends out of the tubular member through the connecting-member passing hole, and is connected to the buckle.

In the pretensioner of the present invention having such a configuration, the linear piston sliding portion in which the piston is slidably fitted, and the gas-generator accommodating portion in which the gas generator is accommodated are formed by a single tubular member. Therefore, a special component for the gas-generator accommodating portion is unnecessary, and this reduces the number of components and the number of assembly processes, and reduces the cost. By making the single tubular member of a relatively light metal, such as iron or aluminum, the gas-generator accommodating portion need not be die-cast in zinc that has been generally used heretofore. Therefore, the weight and thickness are reduced, and the width of the pretensioner can be easily reduced.

The gas generator is disposed in the gas-generator accommodating portion of the curved single tubular member, and is positioned offset from the piston sliding portion in which the piston slides. Therefore, the connecting member and the gas generator are prevented from interfering with each other. This permits of the use of the conventional type of gas generator, reduces the cross-sectional area of the tubular member, and reduces the axial length of the pretensioner.

In this way, the tubular member having the piston sliding portion and the gas-generator accommodating portion is made small, light, and compact, and the pretensioner of the present invention is produced at low cost.

Furthermore, since the length of the gas-generator accommodating portion, the length of the piston sliding portion, the curve angle, and the cross section of the tubular member can be easily and variously changed, the pretensioner of the present invention flexibly and reliably adapts to various types of cars and various mounting conditions of the pretensioner, or the like.

In addition, according to an embodiment of the present invention, the gas-generator accommodating portion can be placed at an arbitrary position with respect to the piston sliding portion. Consequently, the pretensioner of the present invention more flexibly and more precisely adapts to various types of cars, various mounting conditions of the pretensioner, or the like.

Furthermore, according to the present invention, since the connecting-member passing hole is bored coaxially with the piston, the connecting member can be guided without interfering with the gas generator by being passed through the connecting-member passing hole, and this allows easy routing of the connecting member.

It is to be understood that both the foregoing general description and the following detailed description are exemplary and explanatory only and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

DETAILED DESCRIPTION

An embodiment of the present invention will be described below with reference to the drawings.

Figure 1:
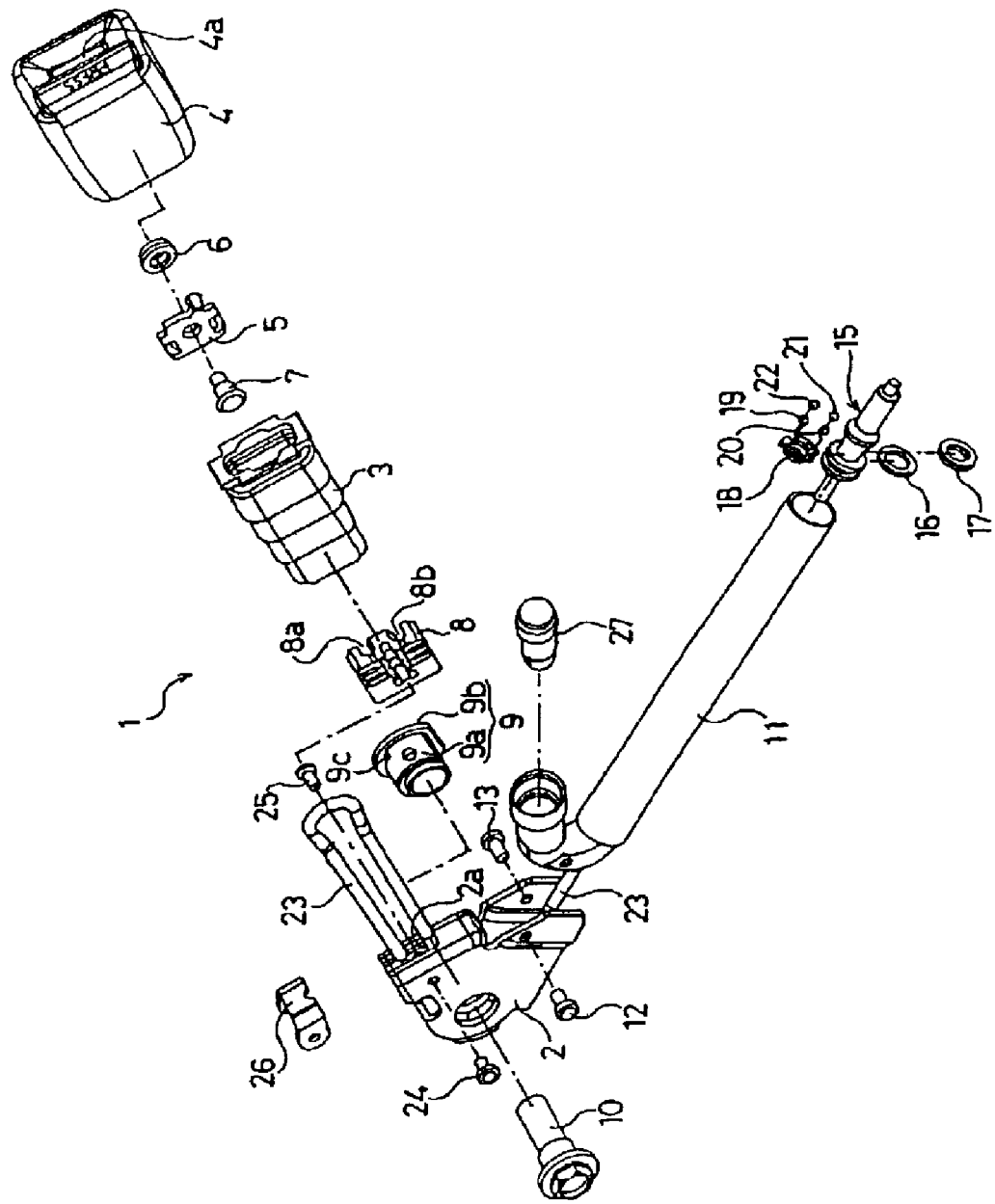
FIG. 1 is an exploded perspective view showing an embodiment in which a pretensioner according to the present invention is applied to a buckle pretensioner.
Figure 2:
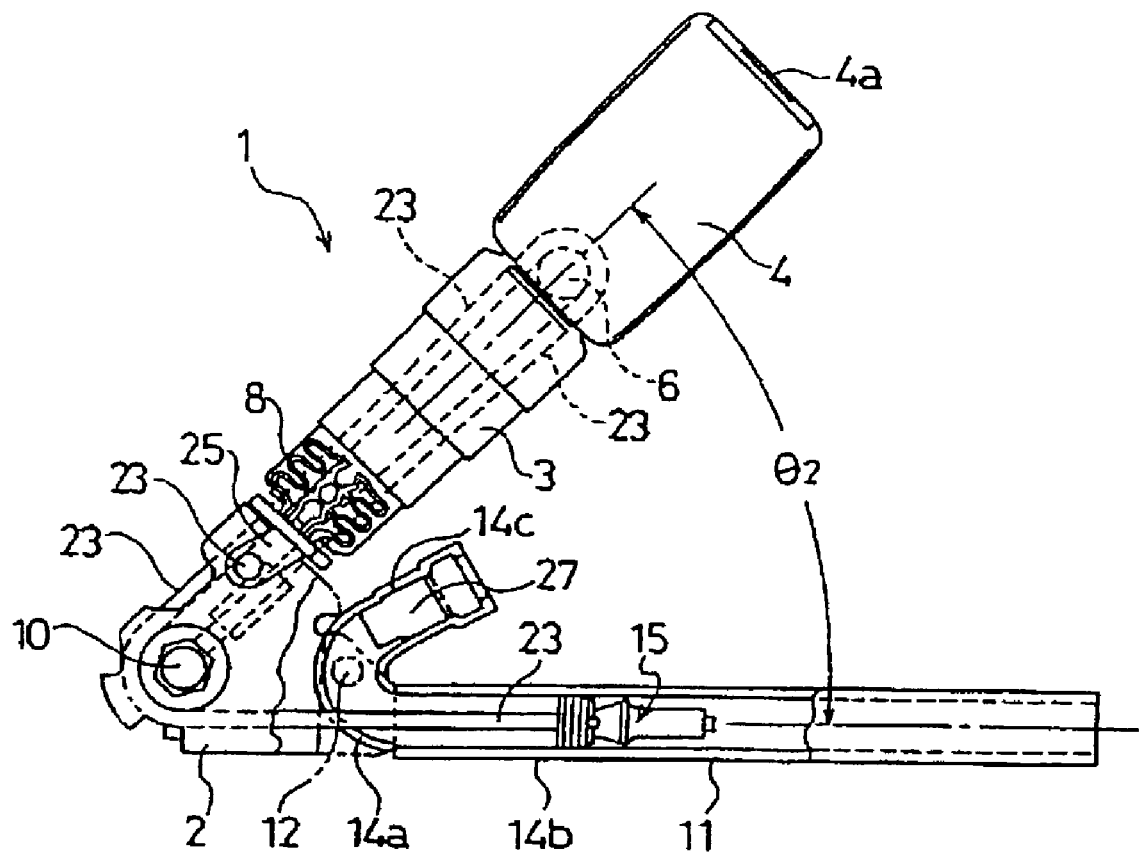
FIG. 2 is a view showing an assembled state of the buckle pretensioner of the embodiment shown in FIG. 1.

FIG. 1 is an exploded perspective view showing an embodiment in which a pretensioner according to the present invention is applied to as a buckle pretensioner, and FIG. 2 is a view showing an assembled state of the buckle pretensioner of this embodiment.

As shown in FIGS. 1 and 2, in a buckle pretensioner 1 of this embodiment, one end of a prismatic inner cover 3 that can be axially telescopic is attached to a bracket 2, and the other end of the inner cover 3 is attached to a buckle assembly 4. A wire plate 5 is mounted in the buckle assembly 4 on the side opposite from an insertion slot 4a of a tongue (not shown), and a pulley 6 is rotatably supported on the wire plate 5 by a rivet 7. A wire holder 8 is attached to the bracket 2 inside one end of the inner cover 3, and has a pair of grooves 8a and 8b for holding and guiding a wire which is described further below.

Figure 3A:
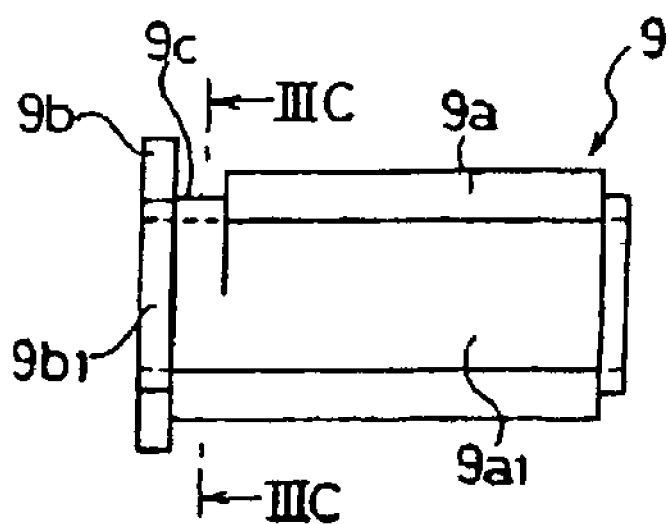
FIG. 3(a) is a front view of a collar.
Figure 3B:
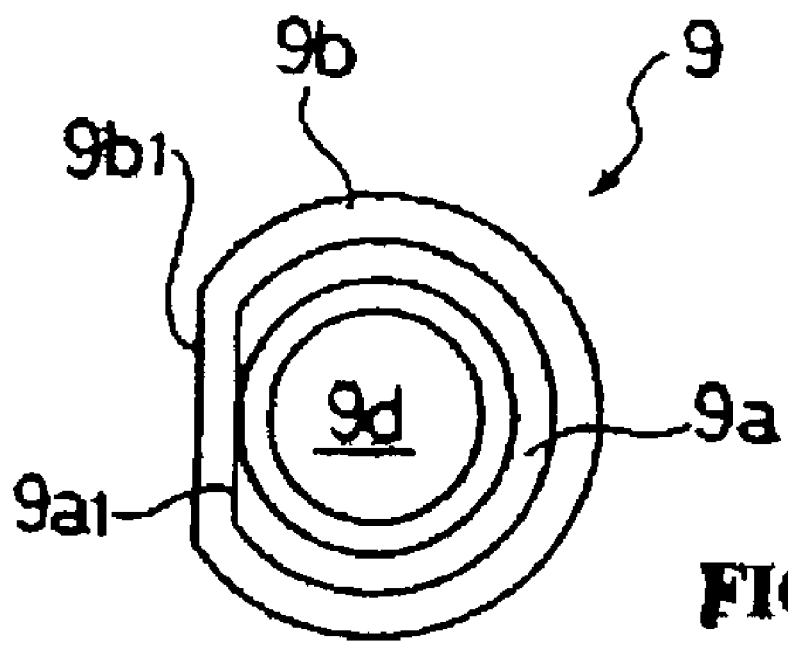
FIG. 3(b) is a right side view of the collar, FIG. 3 (c) is a sectional view, taken along line IIIC—IIIC in FIG. 3(a)
Figure 3C:
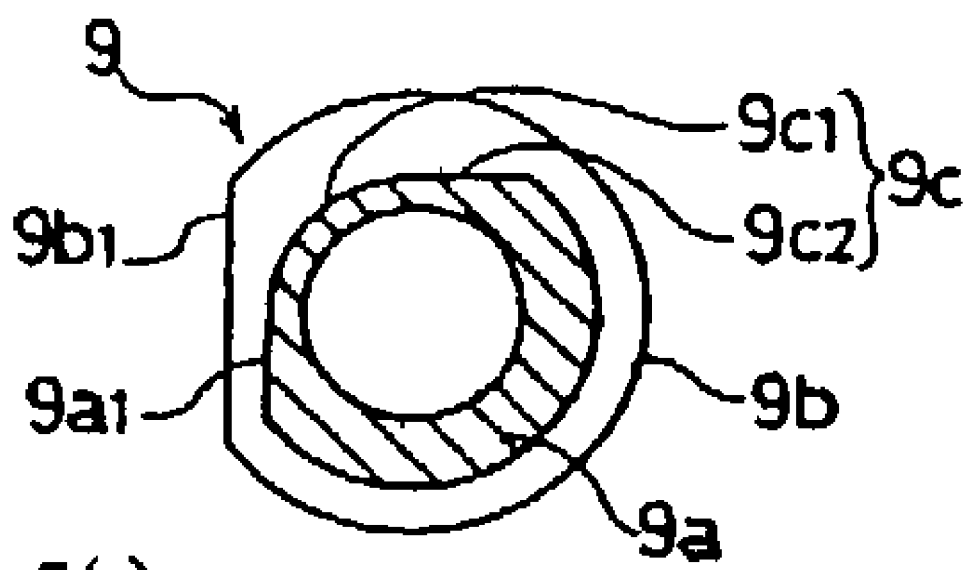
FIG. 3(d) is a partial view of a bracket at a mounting hole.
FIG. 3(e) is a view showing a state in which the collar is fitted in the mounting hole of the bracket.
FIG. 3(f) is a view showing a state in which the collar is fixed in the mounting hole of the bracket.
FIG. 3(g) is a sectional view, taken along line IIIG—IIIG in FIG. 3(f).

A cylindrical collar 9 is placed inside the bracket 2. As shown in FIGS. 3(a) to 3(c), the collar 9 is composed of a shaft portion 9a and a flange portion 9b. The cross section of the shaft portion 9a is shaped like an arc having a flat face 9a1. Similarly, the cross section of the flange portion 9b is shaped like an arc having a flat face 9b1. A groove 9c is formed at a portion of the shaft portion 9a connected to the flange portion 9b, and the groove 9c includes an arc-shaped portion 9c1 which is connected to a part of the flat face 9a1 of the shaft portion 9a and is concentric with the shaft portion 9a. The groove 9c also includes a flat portion 9c2 connected to the arc-shaped portion 9c1.

Figure 3D:
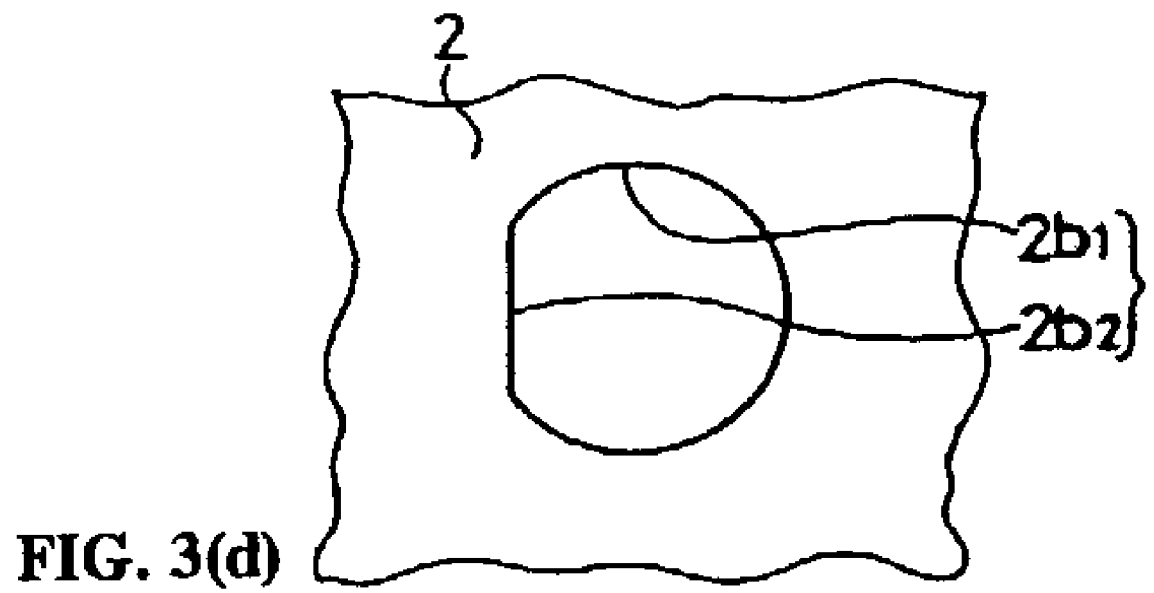
Figure 3E:
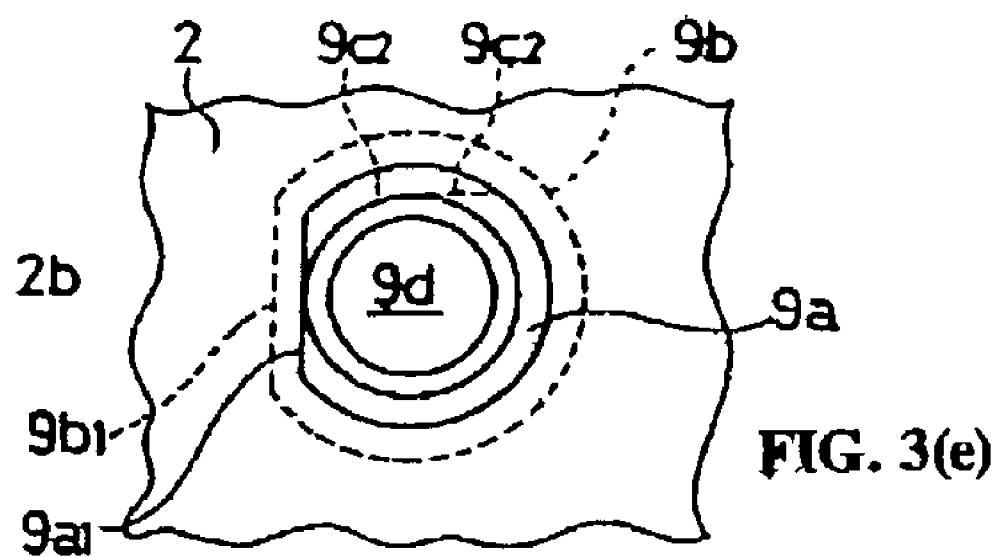
Figure 3F:
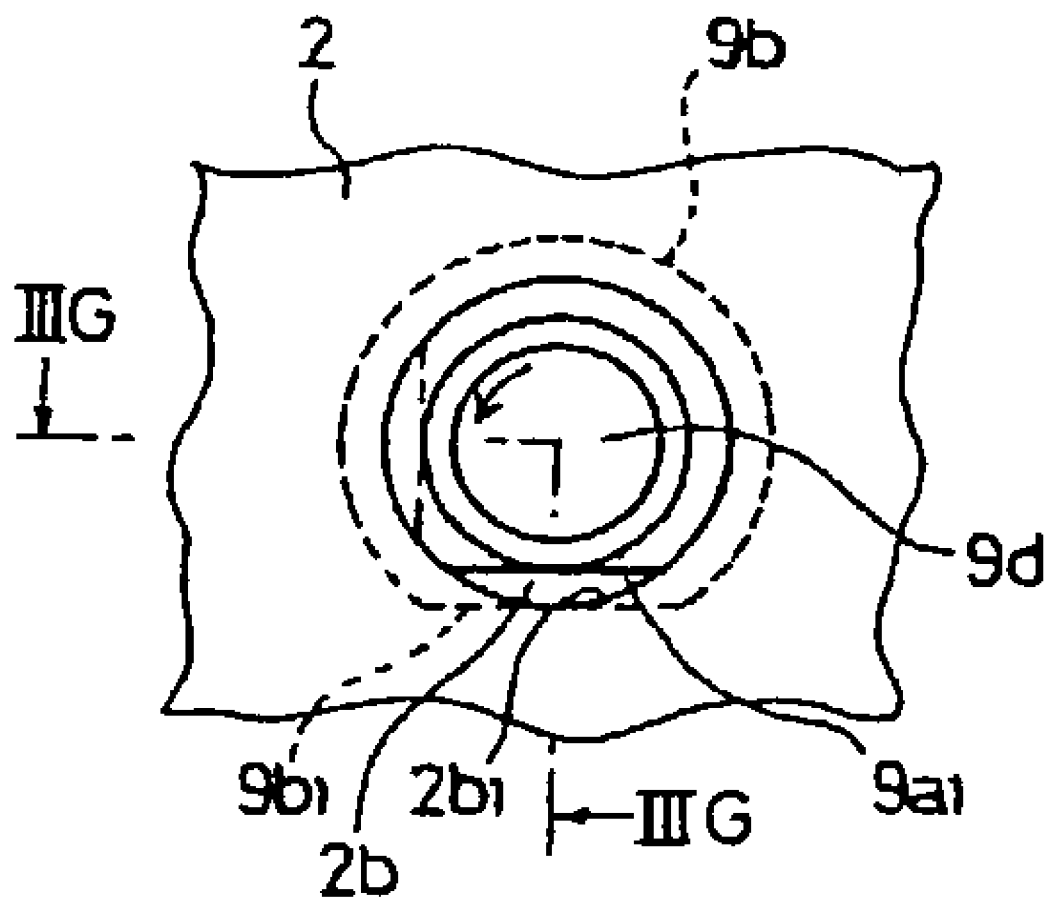
Figure 3G:
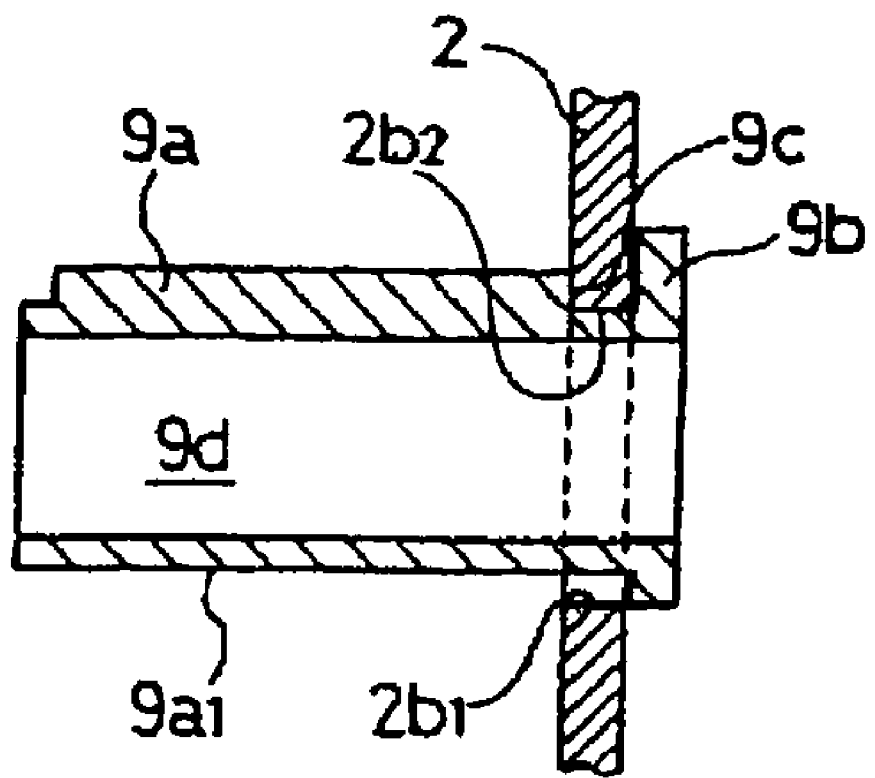

As shown in FIG. 3(d), a mounting hole 2b composed of an arc-shaped portion 2b1 and a linear portion 2b2 is bored in the bracket 2. The mounting hole 2b has a size such that the shaft portion 9a of the collar 9 can pass therethrough, and the flange portion 9b cannot pass therethrough. As shown in FIG. 3(e), in a state in which the flat face 9a1 of the shaft portion 9a is aligned with the linear portion 2b2 of the mounting hole 2b, the shaft portion 9a is passed through the mounting hole 2b, and the bracket 2 is placed in the groove 9c. When the collar 9 is rotated in a direction shown by the arrow in this state, as shown in FIG. 3(f), a peripheral portion of the mounting hole 2b of the bracket 2 corresponding to the linear portion 2b2 of the mounting hole 2b enters the groove 9c and is fitted therein, as shown in FIG. 3(g). Consequently, the collar 9 is fixed to the bracket 2.

Furthermore, a cylinder 11 is attached to the bracket 2 with a pair of screws 12, 13. As shown in detail in FIG. 4, the cylinder 11 is formed of a cylindrical pipe 14 (i.e., tubular member) that is made of, for example, iron or aluminum. In this case, a side of the pipe 14 attached to the bracket 2 is curved at a predetermined angle THETA1, and a curved portion 14a of the pipe 14 is attached to the bracket 2 with the pair of screws 12, 13. A linear portion of the pipe 14 continuing from the curved portion 14a serves as a piston sliding portion 14b (that is, the cylinder 11) in which a piston 15 slides, and the other linear portion of the pipe 14 serves as a gas-generator accommodating portion 14c that accommodates a gas generator 27 which is described further below.

In this case, an angle between the center axis of the piston sliding portion 14b of the cylinder 11 and the center axes of the buckle assembly 4 and the inner cover 3 is set at a predetermined angle THETA2. A wire-passing hole 14d is bored coaxially with the piston sliding portion 14b of the pipe 14 (i.e., coaxially with the piston 15), for example, by punching.

Figure 6A:
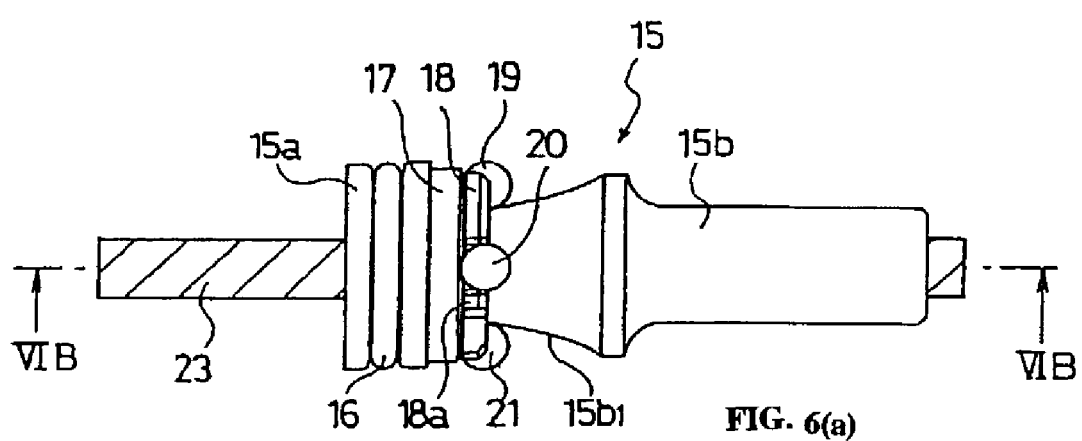
FIG. 6(a) is a front view of a piston in the buckle pretensioner of the embodiment shown in FIG. 1.
Figure 6B:
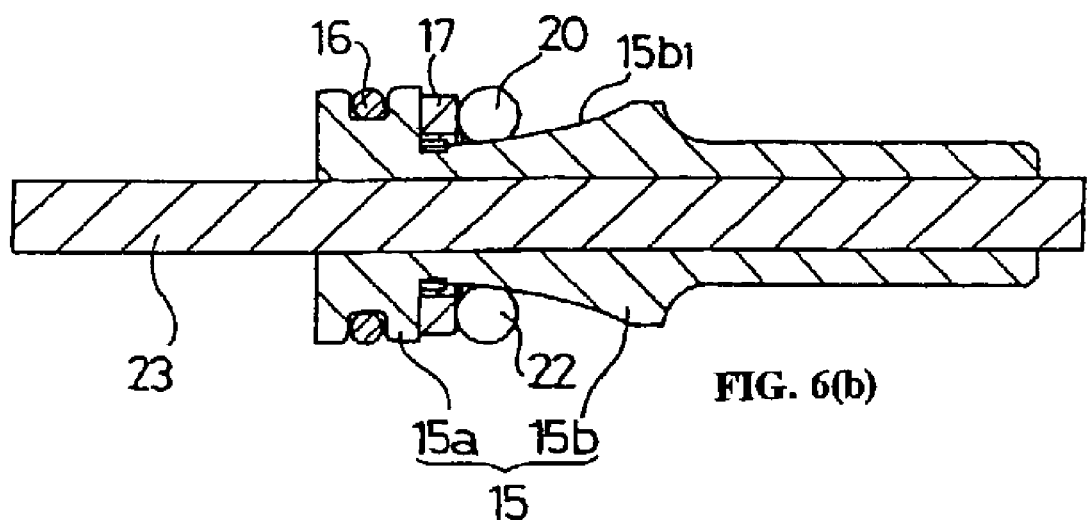
FIG. 6(b) is a sectional view, taken along line VIB—VIB in FIG. 6(a).

The piston 15 is slidably and hermetically placed inside the piston sliding portion 14b of the cylinder 11. As shown in FIG. 6, the piston 15 includes a piston portion 15a and a rod portion 15b extending from the piston portion 15a. The piston portion 15a is provided with an O-ring 16 for blocking the passage of air between the piston portion 15a and the inner peripheral surface of the piston sliding portion 14b. A ball ring 17, and a C-ring ball holder 18 made of resin or a metal having a spring characteristic are fitted on the rod 15b. The ball holder 18 has four grooves 18a (only one is shown in FIG. 6), and four balls 19, 20, 21, and 22 are fitted in the grooves 18a, respectively.

In this case, the four balls 19, 20, 21, and 22 are in contact with an outer peripheral surface 15b1 of the rod 15b. The outer peripheral surface 15b1 is curved or inclined so that the diameter thereof increases toward the right in the axial direction in FIG. 6. The four balls 19, 20, 21, and 22 are normally fitted in the illustrated grooves 18a, and are hardly pressed against the inner peripheral surface of the piston sliding portion 14b in this case, so that the piston 15 can easily move to the right. When the piston 15 slightly moves to the left, the four balls 19, 20, 21, and 22 move to the right, and therefore, are strongly pressed against the inner peripheral surface of the piston sliding portion 14b by the outer peripheral surface 15b1.

Because of the pressing of these balls 19, 20, 21, and 22 against the inner peripheral surface of the cylinder 11, the piston 15 engages with the inner peripheral surface of the piston sliding portion 14b, and is thereby prevented from moving to the left.

In this way, the four balls 19, 20, 21, and 22, the outer peripheral surface 15b1 of the rod 15b, and the inner peripheral surface of the piston sliding portion 14b constitute a one-way clutch that does not allow the piston sliding portion 14b and the piston 15 to be engaged so that the piston 15 can move to the right relative to the piston sliding portion 14b, and that allows the piston sliding portion 14b and the piston 15 to engage in order to prevent the piston 15 from moving to the left relative to the piston sliding portion 14b.

One end of a wire 23 passes through the piston portion 15a and the rod 15b, and is connected to a side of the rod 15b opposite from the piston portion 15a. The wire 23 extends from the piston 15 outside the cylinder 11 through the wire-passing hole 14d, and is curved by the collar 9 attached to the bracket 2 so as to change the direction thereof toward the buckle assembly 4. The wire 23 further extends toward the buckle assembly 4 while being held and guided by one groove 8a of the wire holder 8, extends back toward the bracket 2 after being wound on the pulley 6 that is rotatably supported in the buckle assembly 4, and further extends while being held and guided by the other groove 8b of the wire holder 8.

Figure 5:
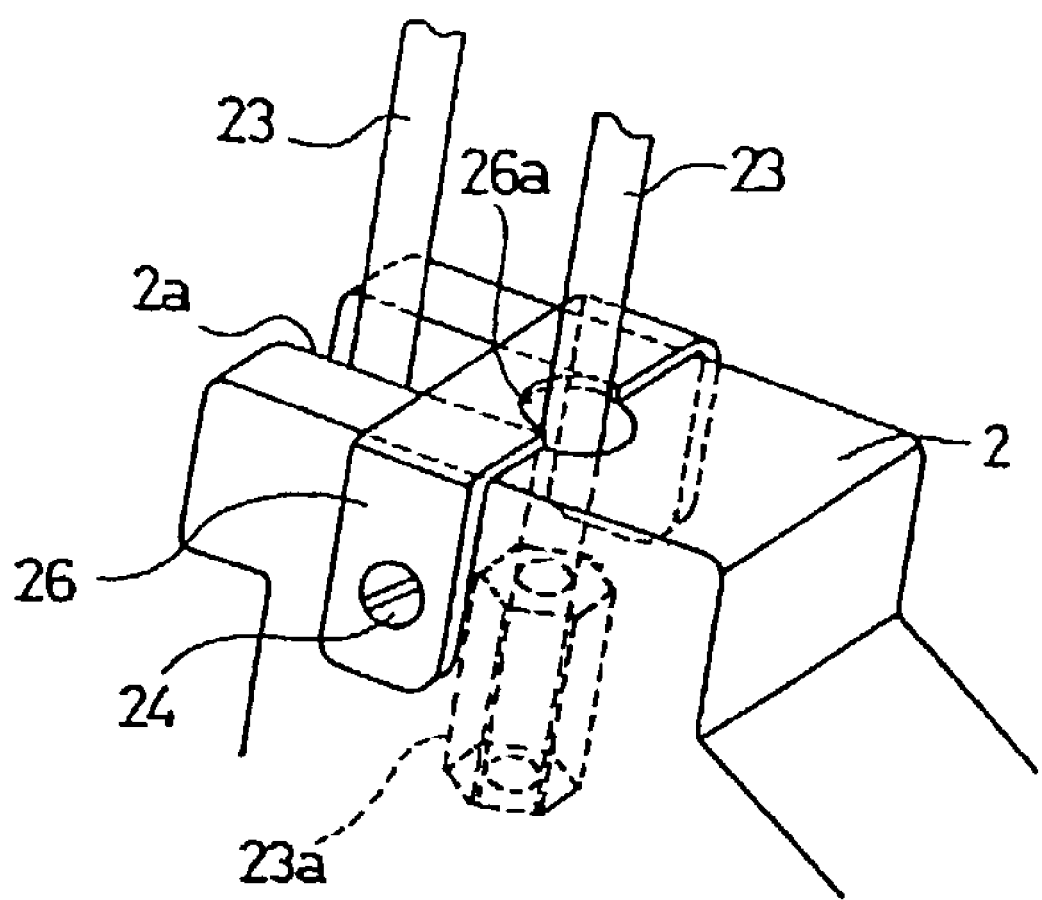
FIG. 5 is a partial perspective view showing a state in which a wire end is fixed to the bracket.

As shown in FIG. 5, the other end of the wire 23 is staked with a wire end 23a, and the wire end 23a is caught in a U-groove 2a formed in the bracket 2. A portion of the wire 23 above the wire end 23a is held by an arc-shaped recess 26a of a sub-bracket 26 fixed to the bracket 2 with a pair of screws 24 and 25, and the U-groove 2a, so that the wire 23 is positioned.

Figure 4A:
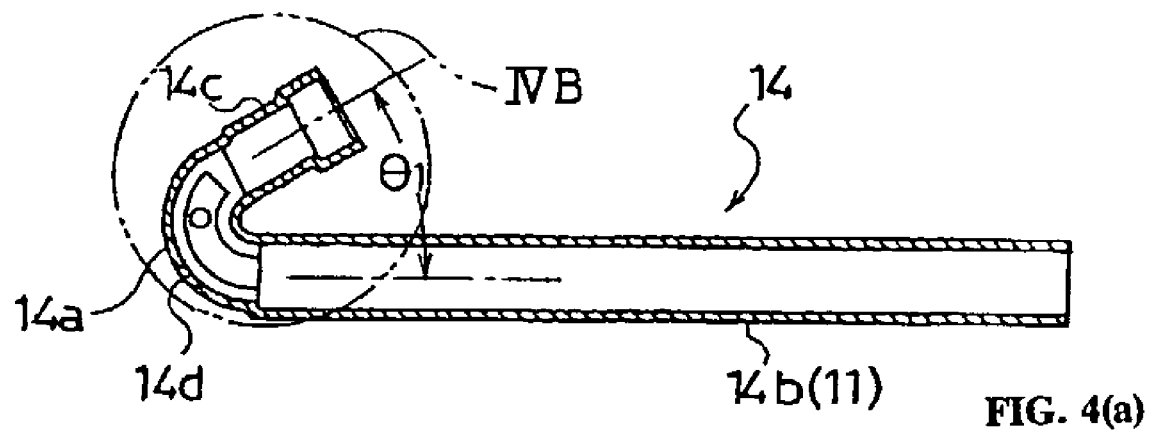
FIG. 4(a) is an axial sectional view of a cylindrical pipe that forms a cylinder.
Figure 4B:
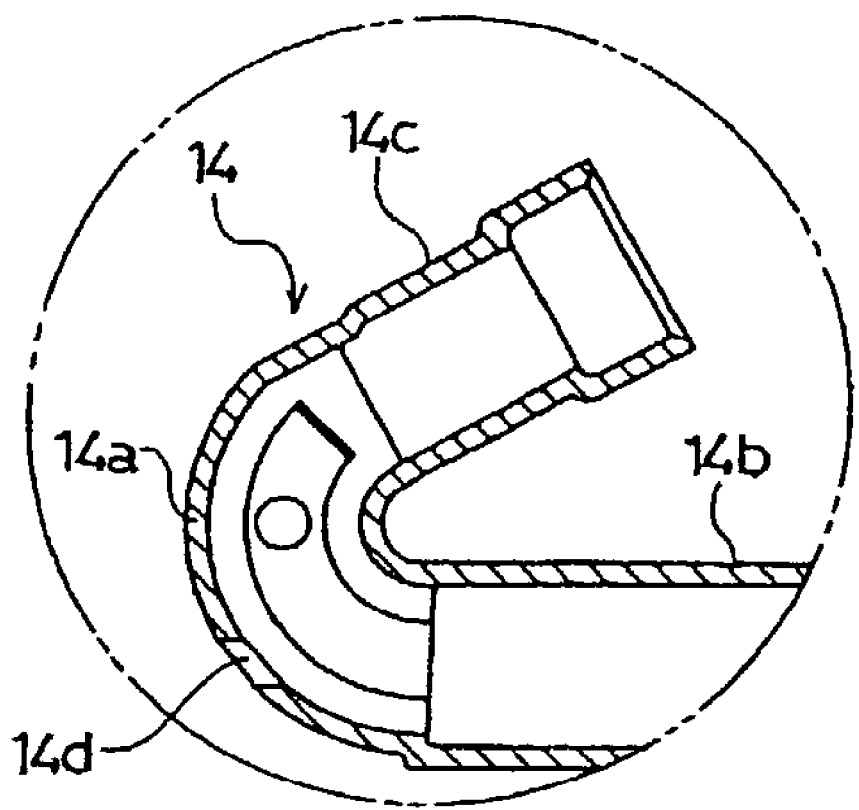
FIG. 4(b) is an enlarged sectional view of a section IV in FIG. 4(a).

As shown in FIG. 4, the other linear portion of the pipe 14 may be machined to accommodate the gas generator 27. The gas generator 27 that has been generally used hitherto is fixedly accommodated in the gas-generator accommodating portion 14c. That is, the cylinder 11 in which the piston 15 slides, and a pressure vessel in which the gas generator 27 is accommodated are formed by the parts of the single pipe 14. In this case, the gas generator 27 is positioned offset from the center axis of the piston 15 so that it does not interfere with the wire 23.

According to this embodiment of the present invention, when the pretensioner 1 is in a normal state (i.e., not operating) the inner cover 3 is extended to its longest length, and the buckle assembly 4 is positioned at the longest distance from the bracket 2, as shown in FIG. 2.

When a high deceleration is caused in the vehicle, for example, in the case of a vehicle collision in a state in which a tongue is inserted from the insertion slot 4a and is engaged with the buckle assembly 4, and the seat belt is worn, the gas generator 27 is actuated to generate gas. The generated gas flows through the curved portion 14a of the pipe 14 and enters the piston sliding portion 14b, and the gas pressure acts on the piston 15. Since the piston 15 then moves to the right in FIG. 2, the wire 23 is pulled, the inner cover 3 is contracted, and the buckle assembly 4 is pulled toward the bracket 2. Consequently, the seat belt is pulled via the buckle assembly 4 and the tongue, and the restraint force on the occupant is increased.

According to this embodiment of the present invention, the pressure vessel for accommodating the gas generator 27 and the cylinder 11 in which the piston 15 slides are formed by the single pipe component. Thus, the number of components and the number of assembly processes can be decreased, and the cost can be reduced. In particular, since the pressure vessel for the gas generator 27 is not die-cast in zinc that has been generally used, the weight and thickness can be reduced, and the width of the pretensioner 1 can be reduced.

Since the gas generator 27 is disposed in the gas-generator accommodating portion 14c of the pipe 14 so that it is positioned offset from the center axis of the piston 15, it is possible to prevent the wire 23 and the gas generator 27 from interfering with each other. This makes it possible to use the conventional type of gas generator 7, to reduce the diameter of the pipe 14 that forms the cylinder 11, and to reduce the axial length of the buckle pretensioner 1.

The pressure vessel for accommodating the gas generator 27 and the cylinder 11 in which the piston 15 slides can be made small, light, and compact.

In addition, since the wire-passing hole 14d is bored in the pipe 14 so that it is coaxial with the center axis of the piston sliding portion 14b (that is, the center axis of the piston 15), the wire 23 can be guided without interfering with the gas generator 27 by being passed through the wire-passing hole 14d, and this allows easy routing of the wire 23.

Figure 7:
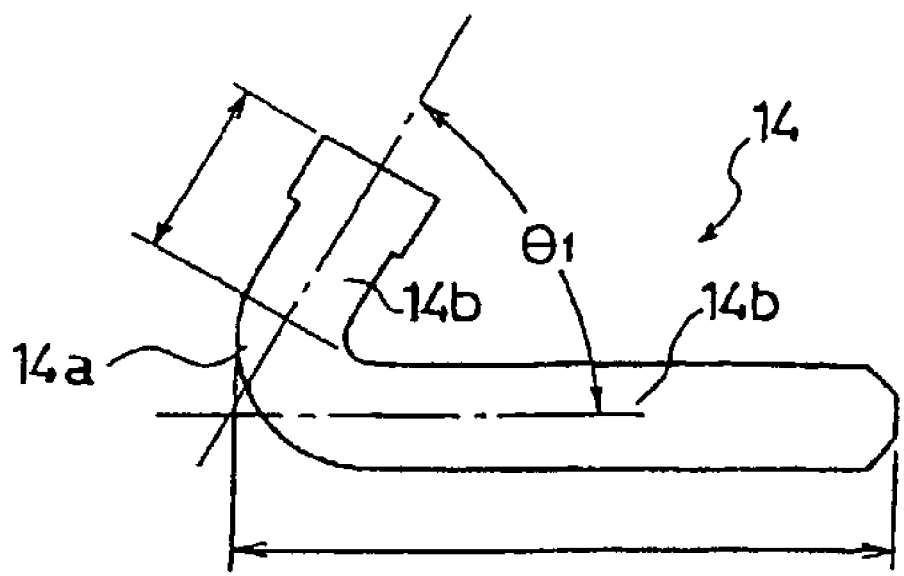
FIG. 7 is a view explaining that the length a of a gas-generator accommodating section, the length b of a piston sliding portion, the curve angle THETA, and the diameter d of a tubular member can be easily and variably changed, and that the buckle pretensioner of the present invention can flexibly and reliably adapt to various types of cars.

Moreover, since the conventional type of gas generator 27 can be used, the buckle pretensioner 1 of this embodiment can be produced at low cost. Furthermore, since the length a of the gas-generator accommodating portion 14c, the length b of the piston sliding portion 14b, the curve angle THETA1, and the diameter d of the pipe 14 can be easily and changed, as shown in FIG. 7, it is possible to flexibly and reliably adapt to various types of cars.

According to this embodiment of the present invention, since the required buckle pretensioning performance of the buckle pretensioner 1 can be ensured even when the gas leaks from the wire-passing hole 14d, it is unnecessary to take measures to prevent the gas from leaking from the wire-passing hole 14d. When measures need to be taken to prevent the gas from leaking from the wire-passing hole 14d, a sealing component made of resin or the like is placed at the wire-passing hole 14d or adjacent thereto, and the wire 23 is slidably passed through the sealing component.

Figure 8A:
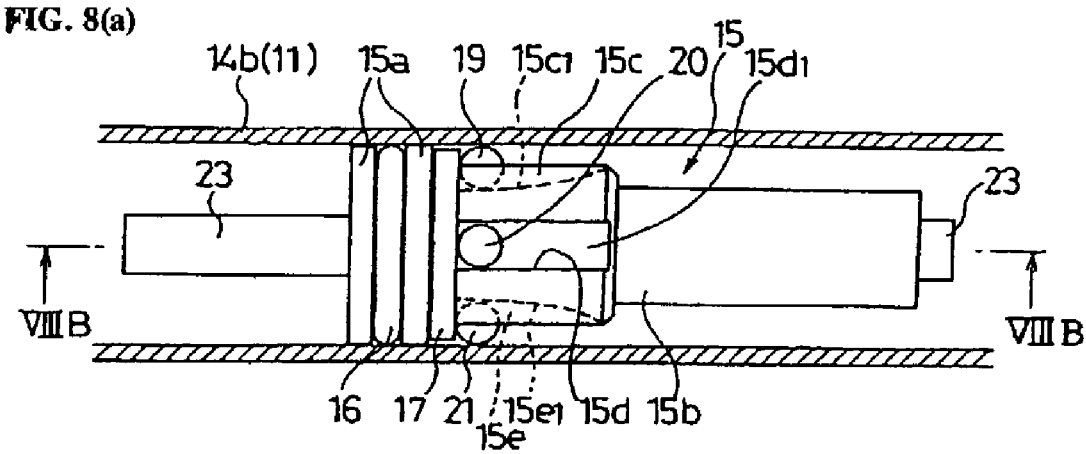
FIG. 8(a) is a front view of another example of a piston.
Figure 8B:
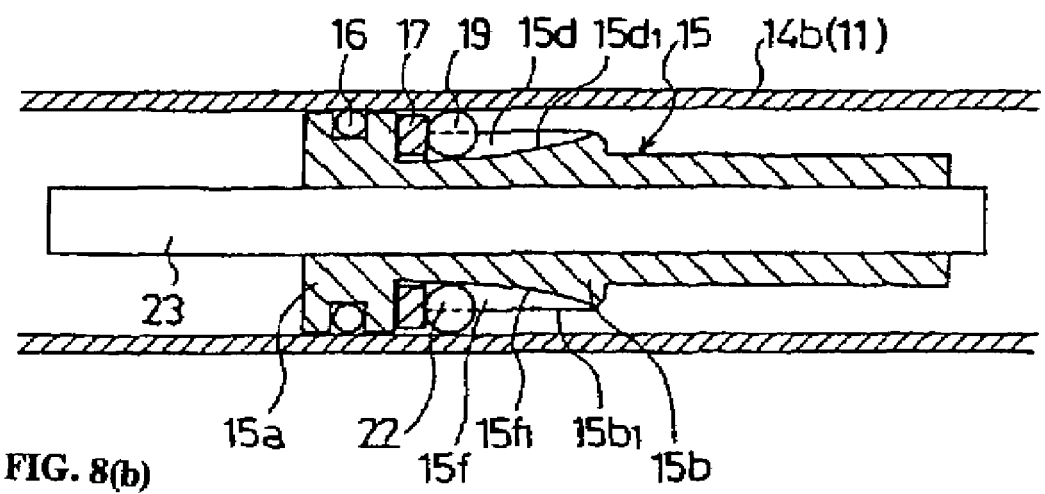
FIG. 8(b) is a sectional view, taken along line VIIIB—VIIIB in FIG. 8(a), in a manner similar to FIG. 6.

Another embodiment of the present invention is shown in FIG. 8, which is a view similar to FIG. 6. FIG. 8 discloses a piston 15 in which the ball holder 18 having the grooves 18a is provided and the outer peripheral surface 15b1 of the rod 15b is simply curved or inclined in the axial direction in the above-described embodiment shown in FIG. 6, the piston 15 of this example does not have the ball holder 18 having the grooves 18a, and an outer peripheral surface 15b1 of a rod 15b has a fixed diameter, as shown in FIGS. 8(a) and 8(b). In the piston 15 of this example, the outer peripheral surface 15b1 of the rod 15b has four axial grooves 15c, 15d, 15e, and 15f formed at regular intervals in the circumferential direction.

Bottom surfaces 15c1, 15d1, 15e1, and 15f1 of the axial grooves 15c, 15d, 15e, and 15f are curved or inclined, in a manner similar to the curved or inclined outer peripheral surfaces 15b1 of the rod 15b in the above embodiment shown in FIG. 6. Balls 19, 20, 21, and 22 are fitted in the axial grooves 15c, 15d, 15e, and 15f, respectively, and these balls 19, 20, 21, and 22 can move on the bottom surfaces 15c1, 15d1, 15e1, and 5f1 along the axial grooves 15c, 15d, 15e, and 15f. Therefore, in the piston 15 of this example, the four balls 19, 20, 21, and 22, the axial grooves 15c, 15d, 15e, and 15f, the bottom surfaces 15c1, 15d1, 15e1, and 15f1, and the cylinder inner peripheral surface constitute a one-way clutch that does not allow the cylinder 11 and the piston 15 to be engaged so that the piston 15 moves to the right relative to the cylinder 11, and that allows the cylinder 11 and the piston 15 to be engaged so as to prevent the piston 15 from moving to the left relative to the cylinder 11.

Figure 9A:
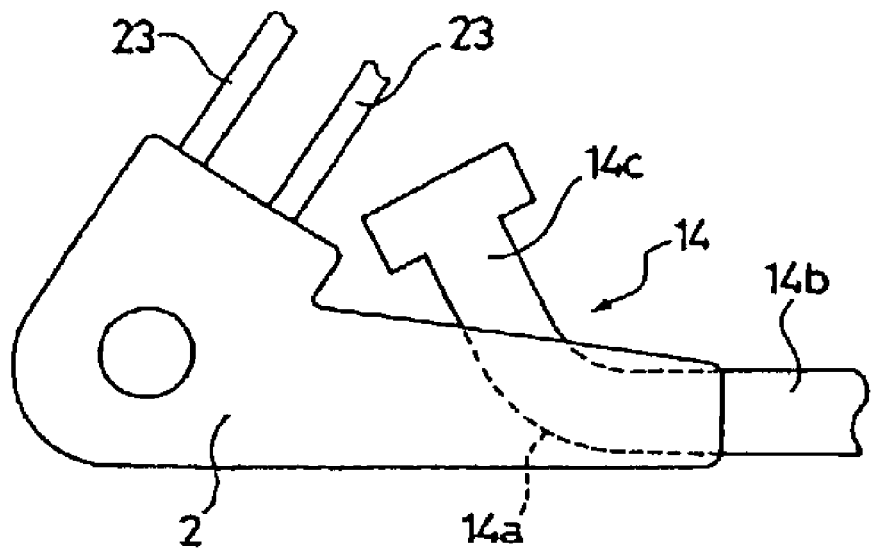
FIGS. 9(a) to 9(c) are views showing modifications of the pipe that forms the cylinder.
Figure 9B:
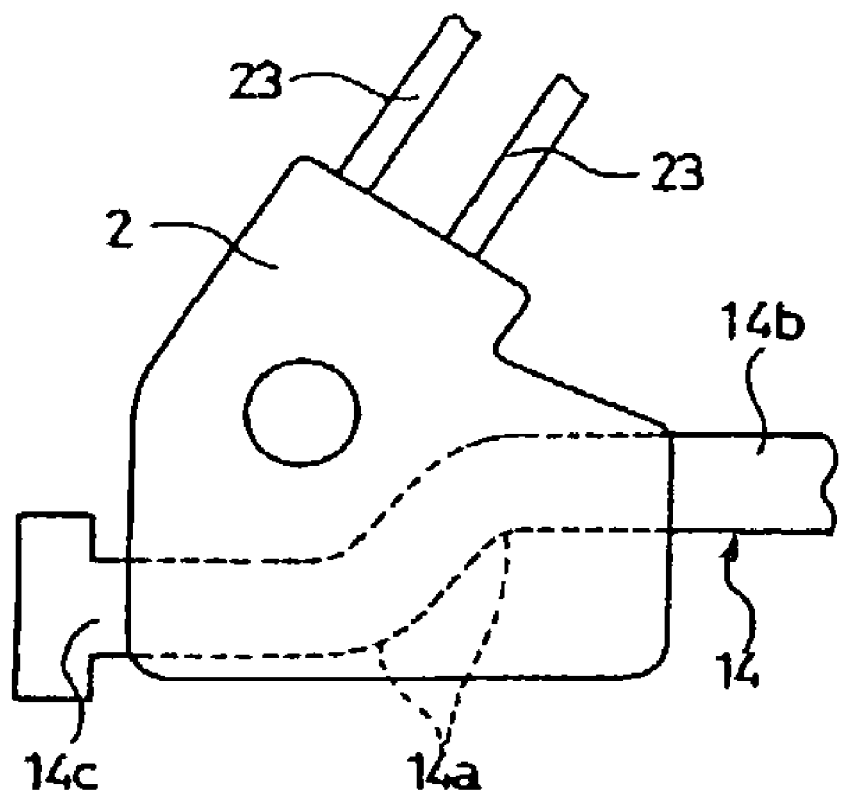
Figure 9C:
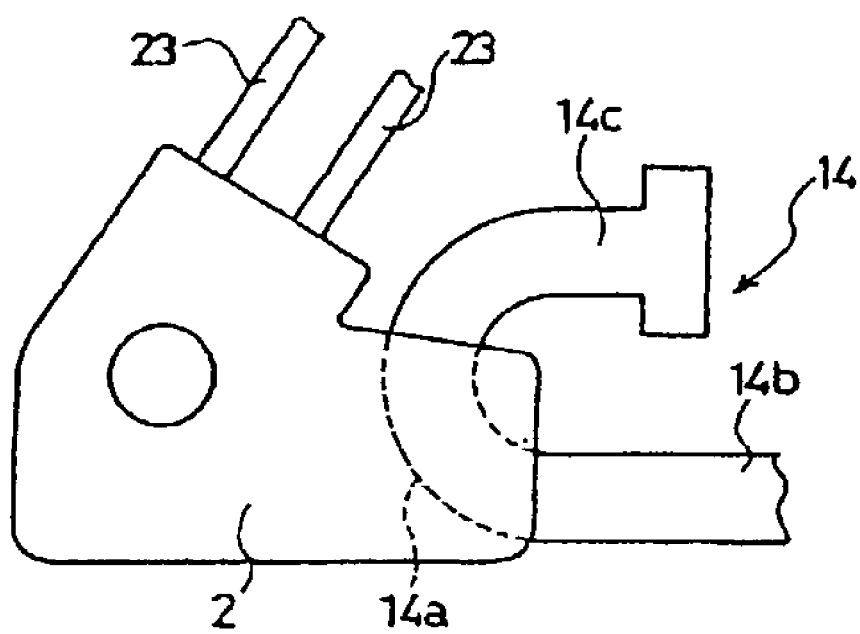

Another embodiment of the present invention is disclosed in FIGS. 9(a) to 9(c), which are views showing alternatives of the cylindrical pipe 14 that form the cylinder 11.

While the pipe 14 in the above embodiment shown in FIG. 4 is bent so that the gas-generator accommodating portion 14c extends toward the piston sliding portion 14b to form a predetermined acute angle THETA1 with the piston sliding portion 14b, a pipe 14 in a modification shown in FIG. 9(a) is curved so that a gas-generator accommodating portion 14c extends toward the side opposite from a piston sliding portion 14b to form a predetermined obtuse angle THETA1 with the piston sliding portion 14b. Other structures of the pipe 14 of this modification are the same as those in the pipe 14 in the embodiment shown in FIG. 4. The predetermined angle THETA1 may be set at 90°, that is, the gas-generator accommodating portion 14c may be placed at right angles to the piston sliding portion 14b.

A pipe 14 in a modification shown in FIG. 9(b) is bent downward at the midpoint thereof so that a gas-generator accommodating portion 14c extends in parallel with a piston sliding portion 14b and toward the side opposite from a supporting portion of the bracket 2 for supporting the piston sliding portion 14b. That is, the gas-generator accommodating portion 14c is not coaxial with the piston sliding portion 14b, but is in parallel therewith. Other structures of the pipe 14 of this modification are the same as those in the pipe 14 in the example shown in FIG. 4. Furthermore, a pipe 14 in a modification shown in FIG. 9(c) is bent so that a gas-generator accommodating portion 14c extends in parallel with a piston sliding portion 14b (that is, the predetermined angle THETA1 is equal to zero), and toward the piston sliding portion 14b. Other structures of the pipe 14 of this modification are the same as those in the embodiment shown in FIG. 4.

According to the exemplary embodiments of the present invention shown in FIGS. 9(a) to 9(c), the gas-generator accommodating portion 14c can be arbitrarily positioned with respect to the piston sliding portion 14b. This allows the pretensioner 1 to more flexibly and more precisely adapt to various types of cars, various mounting conditions of the pretensioner 1, or the like.

Figure 10:
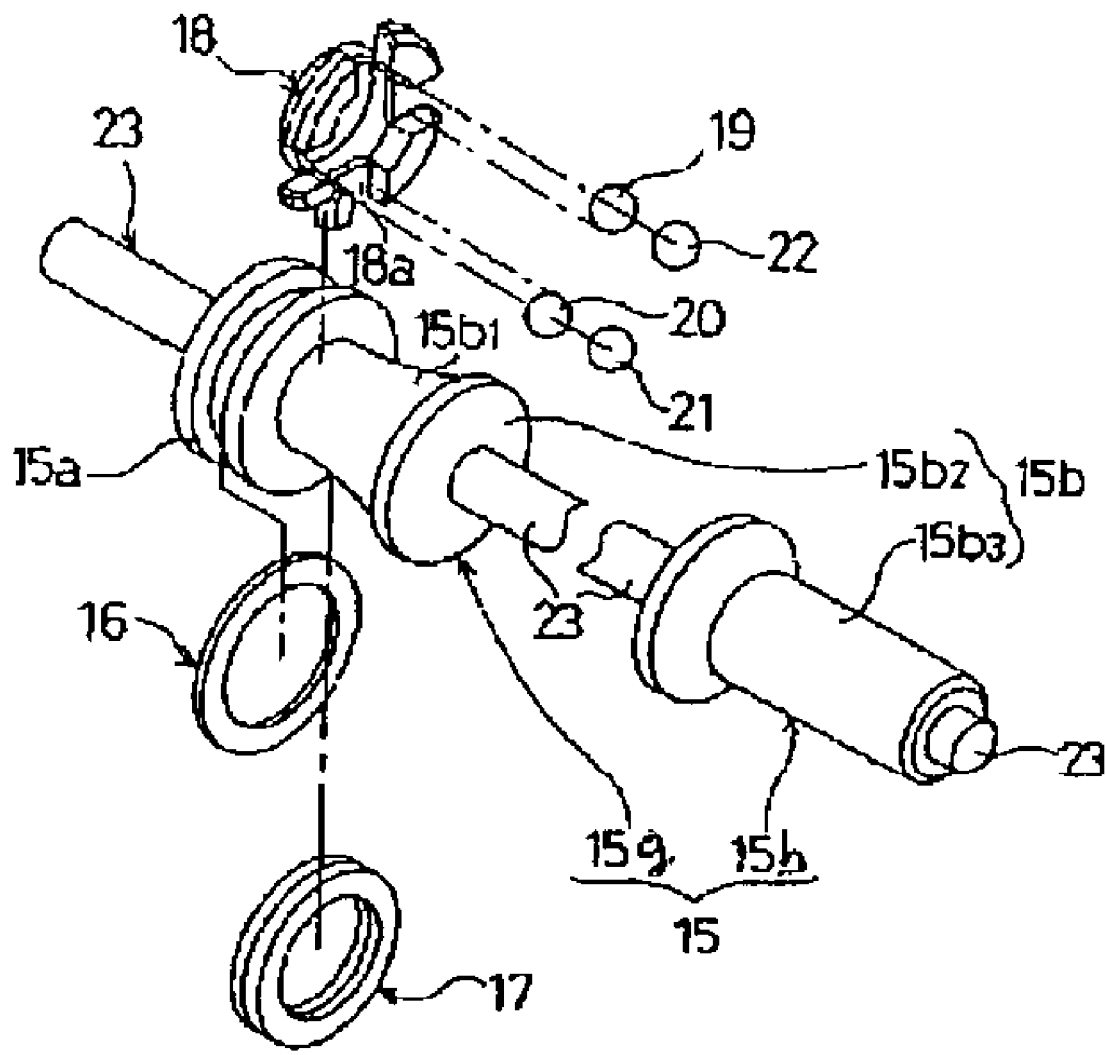
FIG. 10 is a view showing a modification of the piston.

Yet another alternative embodiment of the present invention is disclosed in FIG. 10, which is a view showing a modification of the piston 15. The piston 15 in the above embodiment shown in FIG. 6 is formed of a single member. However, as shown in FIG. 10, the piston 15 may include two members. The piston 15 may include a first piston member 15g including a piston portion 15a and one division 15b2 of a rod 15b, and a second piston member 15h formed of the other division 15b3 of the rod 15b. Other structures of the piston 15 of this modification are the same as those in the embodiment shown in FIG. 6. By thus forming the piston 15 of two members, the production of the piston 15 is facilitated.

Figure 11:
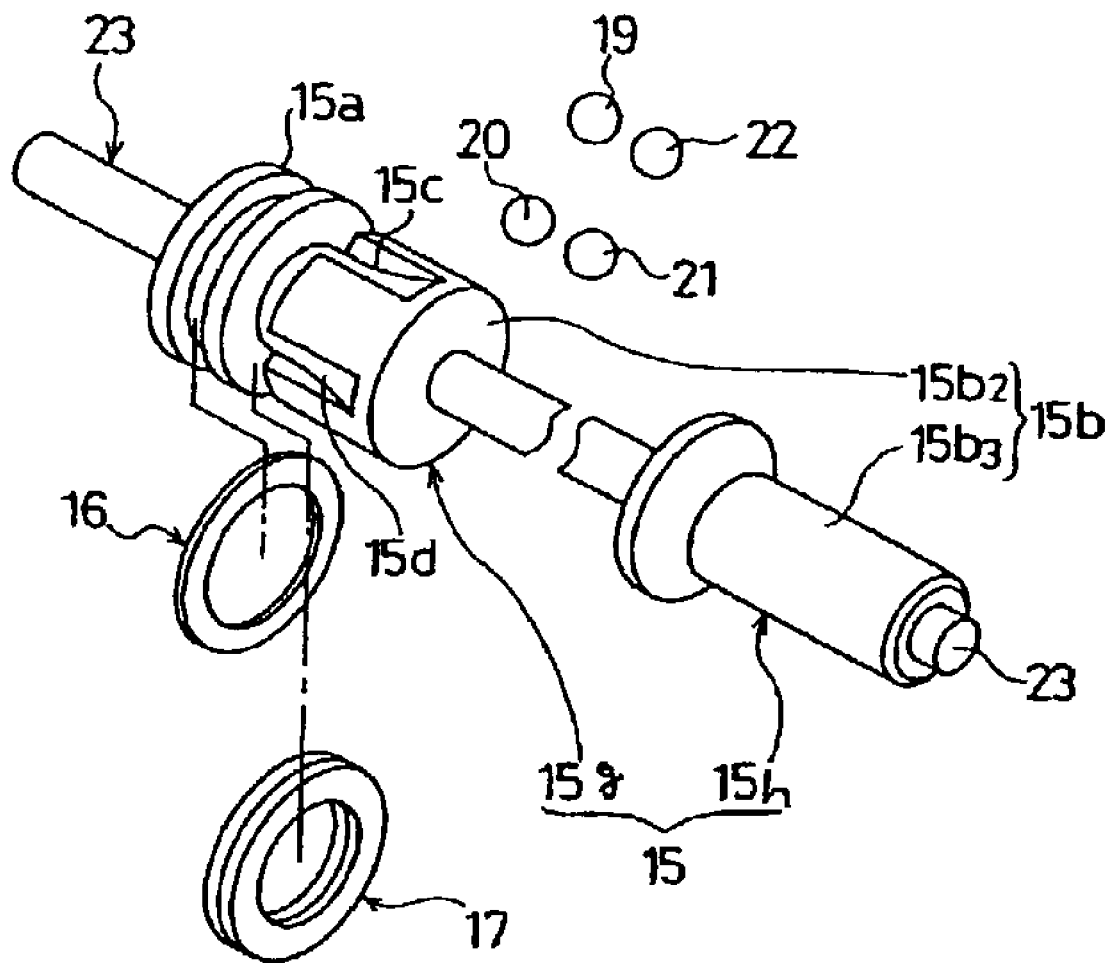
FIG. 11 is a view showing another modification of the piston.

Another alternative embodiment of the present invention is disclosed in FIG. 11, which is a view showing another modification of the piston 15. The piston 15 in the above example shown in FIG. 8 is formed of a single member. However, as shown in FIG. 11, a piston 15 according to this embodiment of the present invention has four axial grooves 15c and 15d (15e and 15f are not shown) formed on an outer peripheral surface 15b1 of a rod 15b, as shown in FIG. 11, in a manner similar to that in the piston 15 of the example shown in FIG. 8. The piston 15 is divided into two members, a first piston member 15g composed of a piston portion 15a and one division of the rod 15b, and a second piston member 15h formed of the other division of the rod 15b, in a manner similar to that in the modification shown in FIG. 10. Other structures of the piston 15 of this modification are the same as those in the piston 15 of the example shown in FIG. 8.

Figure 12A:
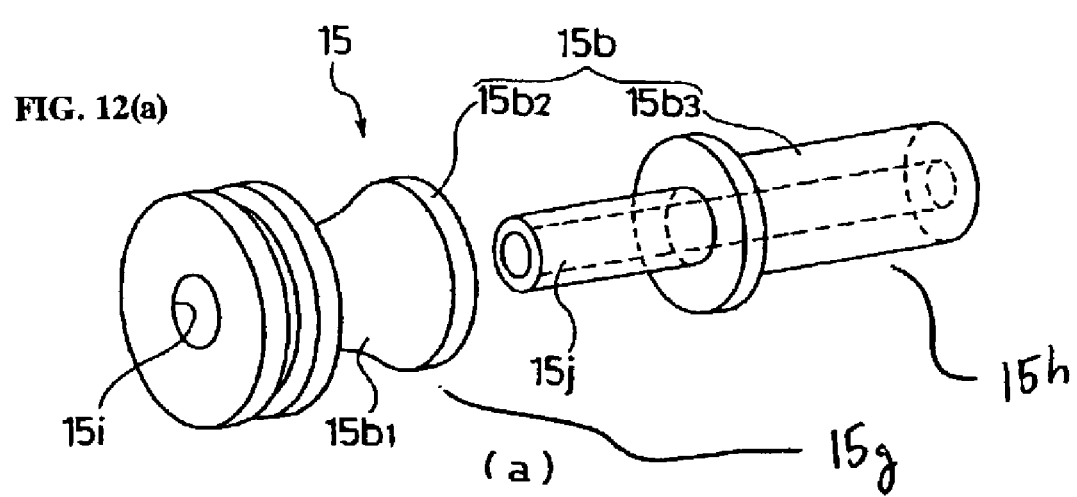
FIG. 12(a) is an exploded perspective view of a piston according to an embodiment of the present invention.
Figure 12B:
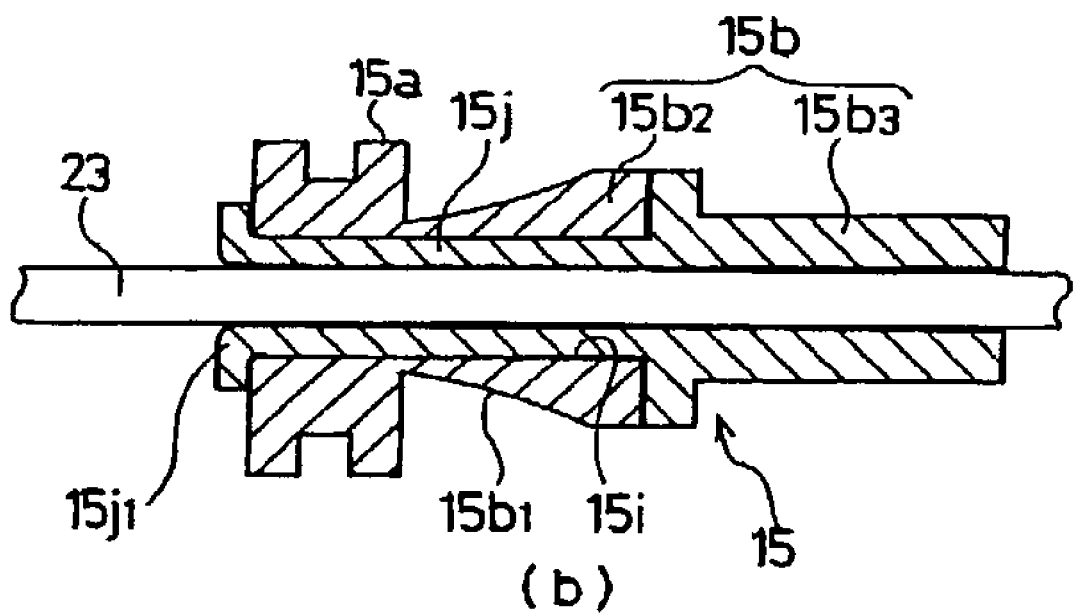
FIG. 12(b) is a sectional view of the piston of FIG. 12(a).

Another alternative embodiment of the present invention is shown in FIGS. 12(a) and 12(b), which are an exploded perspective view and a sectional view, respectively, of a further modification of the piston 15. As shown in FIG. 12(a), the piston 15 is divided into two members, a first piston member 15g composed of a piston portion 15a and one division of the rod 15b, and a second piston member 15h formed of the other division of the rod 15b. The first piston member 15g includes an axial hole 15i larger than the axial hole, through which the wire 23 passes in the above embodiments. The second piston member 15h has a cylindrical extended portion 15j extending in the axial direction, and the length of the extended portion 15j is set to be more than the axial length of the first piston member 15g.

As shown in FIG. 12(b), the second piston member 15h is combined with the first piston member 15g by passing the extended portion 15j of the second piston member 15h through the axial hole 15i of the first piston member 15g, and caulking an end portion 15j1 protruding from the axial hole 15i. While other structures of the piston 15 of this modification are not shown, the piston 15 is also applicable to the type having the ball holder 18 in the embodiment shown in FIG. 6 and the type having the axial grooves 15c, 15d, 15e, and 15f in the example shown in FIG. 8, and may the same structures as those in the types.

The number of the grooves 18a of the ball holder 18, the number of the balls 19, 20, 21, and 22, and the number the axial grooves 15c, 15d, 15e, and 15f of the outer peripheral surface 15b1 of the rod 15b are not limited to four, and may be selectively determined. The grooves 18a and the axial grooves 15c, 15d, 15e, and 15f need not always be formed at regular intervals in the circumferential direction, and may be formed at selected intervals in the circumferential direction. In order to prevent the piston 15 from being in biased contact with the inner peripheral surface of the cylinder 11, however, it is preferable that the grooves 18a and the axial grooves 15c, 15d, 15e, and 15f be formed at regular intervals in the circumferential direction.

While the wire 23 is wound on the pulley 6 disposed in the buckle assembly 4, and the buckle assembly 4 is pulled via the pulley 6 by drawing the wire 23 in the above embodiments, the present invention is not limited to this structure, and the wire 23 may be simply and directly connected to the buckle assembly 4. The wire 23 may be placed in any manner with respect to the buckle assembly 4 as long as the buckle assembly 4 can be pulled by drawing the wire 23 with the piston 15. Therefore, in the present invention, the wire 23 is connected to the buckle assembly 4 with any structure, including the above-described structure using the pulley 6 as a medium in the above embodiments, as long as the buckle assembly 4 can be pulled by drawing the wire 23.

While the present invention is applied to the buckle pretensioner 1 in the above descriptions of the embodiments, the present invention is not limited thereto, and is also applicable to a lap pretensioner for pretensioning a lap belt of the seat belt.

As is obvious from the above description, in the pretensioner of the present invention, since the piston sliding portion and the gas-generator accommodating portion are formed by a single tubular member so that a special component for the gas-generator accommodating portion is unnecessary, the number of components and the number of assembly processes can be decreased, and the cost can be reduced. Since the tubular member is made of a relatively light metal, such as iron or aluminum, and the gas-generator accommodating portion need not be die-cast in zinc that has been generally used hitherto, the weight and thickness can be reduced, and the width of the pretensioner can be reduced easily.

Since the gas generator is placed offset from the center axis of the piston inside the gas-generator accommodating portion of the curved single tubular member, it is possible to prevent the connecting member and the gas generator from interfering with each other. Consequently, while the conventional type of gas generator can be used, the cross-section area of the tubular member can be reduced, and the axial length of the pretensioner can be reduced.

In this way, the tubular member having the piston sliding portion and the gas-generator accommodating portion can be made small, light, and compact, and the pretensioner of the present invention can be produced at low cost.

Furthermore, since the length of the gas-generator accommodating portion, the length of the piston sliding portion, the curve angle, and the cross section of the tubular member can be easily and variously changed, the pretensioner of the present invention can flexibly and reliably adapt to the various types of cars, various mounting conditions of the pretensioner, and the like.

Moreover, according to the present invention, the gas-generator accommodating portion can be placed at an arbitrarily position with respect to the piston sliding portion. This allows the pretensioner of the present invention to more flexibly and more precisely adapt to various types of cars, various mounting conditions of the pretensioner, and the like.

In addition, according to the present invention, since the connecting-member passing hole is bored concentrically with the piston, the connecting member can be guided without interfering with the gas generator by being passed through the connecting-member passing hole, and this allows easy routing of the connecting member.

The priority applications, Japanese Patent Applications Numbers 2001-244005, filed Aug. 10, 2001 and 2001-271436 filed Sep. 7, 2001 are incorporated by reference herein in their entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A pretensioner for increasing the restraint force of a seat belt on an occupant comprising:
    a connecting member connected to a piston, the piston being configured to be moved by pressure of gas generated by a gas generator,
    a bent tubular member comprising a linear portion having an approximately constant inner diameter and in which the piston is slidably fitted and a gas-generator accommodating portion in which said gas generator is accommodated; and wherein the connecting member is operatively connected to the seat belt and wherein the piston is configured to move entirely only within the linear portion and the connecting member pulls the seat belt when the piston moves.

2. The pretensioner of claim 1, wherein the tubular member includes a bend so that an angle between the direction in which the gas-generator accommodating portion extends and the direction in which the linear portion extends is acute.

3. The pretensioner of claim 1, wherein the tubular member includes an obtuse bend so that the gas-generator accommodating portion extends away from the linear portion.

4. The pretensioner of claim 1, wherein the tubular member includes a bend so that the gas-generator accommodating portion extends in a direction generally perpendicular to said linear portion.

5. The pretensioner of claim 1, wherein the tubular member includes a hole bored coaxially with said piston, the connecting member being positioned to pass through the hole.

6. The pretensioner of claim 1, wherein the connecting member is connected to a seat belt buckle.

7. The pretensioner of claim 1, wherein movement of the piston within the linear portion is limited to a single direction.

8. The pretensioner of claim 1, wherein the linear portion and the gas-generator accommodating portion of the bent tubular member are integrally formed.

9. A pretensioner for increasing the restraint force of a seat belt on an occupant comprising:
   a connecting member connected to a piston, the piston being configured to be moved by pressure of gas generated by a gas generator,
   a bent tubular member having an approximately constant inner diameter and comprising a linear portion in which the piston is slidably fitted and a gas-generator accommodating portion in which said gas generator is accommodated; and
   wherein the connecting member is operatively connected to the seat belt so that when the piston moves the connecting member pulls the seat belt and wherein the gas-generator accommodating portion extends away from and in parallel with said linear portion so as not to be coaxial wit said linear portion.

10. A pretensioner for increasing the restraint force of a seat belt on an occupant comprising:
    a connecting member connected to a piston, the piston being configured to be moved by pressure of gas generated by a gas generator,
    a bent tubular member having an approximately constant inner diameter and comprising a linear portion in which the piston is slidably fitted and a gas-generator accommodating portion in which said gas generator is accommodated; and
    wherein the connecting member is operatively connected to the seat belt so that when the piston moves the connecting member pulls the seat belt, and
    wherein the gas-generator accommodating portion extends in parallel with said linear portion and along said linear portion.

11. A pretensioner for increasing the restraining force of a seat belt on an occupant comprising:
    a bent tubular member comprising a linear portion having an approximately constant inner diameter;
    a piston slidably positioned within the linear portion of the tubular member;
    wherein the piston is connected to a wire operatively connected to the seat belt and wherein the piston is configured to move only within the linear portion due to gas pressure generated by a gas generator, so that the seat belt is pulled to thereby increase the restraining force on the occupant;
    wherein the gas generator is accommodated within the tubular member; and
    wherein the gas generator is located offset from the axis of movement of the piston.

12. The pretensioner of claim 11, wherein the tubular member includes a hole through which the wire passes, the hole being located between the piston and the gas generator.

13. The pretensioner of claim 11, wherein movement of the piston is limited to a single direction.

14. The pretensioner of claim 13, wherein the piston includes a plurality of balls that are forced against an inner surface of the tubular member when the piston is forced in a direction opposite to the single direction.

15. The pretensioner of claim 14, wherein the piston includes an inclined surface that forces the balls against the inner surface of the tubular member.

16. The pretensioner of claim 11, wherein an angle between a line extending parallel to a portion of the tubular member accommodating the gas generator and a line extending along the axis of movement of the piston is acute.

* * * * *